Nov. 19, 1957 W. STEUBER 2,813,775
PROCESS FOR FORMING FILMS AND FILAMENTS
DIRECTLY FROM POLYMER INTERMEDIATES
Filed Feb. 21, 1955

INVENTOR
WALTER STEUBER

BY Francis H. Deef
ATTORNEY 2,813,775
Patented Nov. 19, 1957

United States Patent Office

2,813,775
PROCESS FOR FORMING FILMS AND FILAMENTS DIRECTLY FROM POLYMER INTERMEDIATES

Walter Steuber, Media, Pa., assignor to E. I. du Pont de Nemours and Company, Wilmington, Del., a corporation of Delaware Application February 21, 1955, Serial No. 489,583

20 Claims. (Cl. 18—54)

This invention relates to a process. More particularly it concerns a process for forming a shaped body having a continuous cross section, by combination of two liquid complementary reactive polymer intermediates, the said combination being accomplished by extruding one of the said intermediates into the other.

It is an object of the present invention to provide a process for the production of a shaped body of continuous cross section by combination of two liquid complementary reactive polymer intermediates.

Another object is to provide a process for the production of an elastic shaped body of continuous cross section by combination of two liquid complementary reactive polymer intermediates.

These and other objects will become apparent in the course of the following specification and claims.

In accordance with the present invention a process is provided which comprises forming a solid shaped structure of continuous cross section by combining at least two liquid complementary reactive polymer intermediates, one of which contains at least two active hydrogens more reactive than alcoholic hydrogen, whereas its complement contains at least two reactive groups capable of reacting with alcohol at room temperature to form an ester, and at least one of the said complementary reactive polymer intermediates being a multifunctional organic macromolecule possessing recurring amide type linkages and having a molecular weight within the range of from about 400 to about 7000, and at least one of the other of the said complementary reactive polymer intermediates being a poly functional, essentially monomeric, organic molecule, the proportionate molecular weights of macromolecular intermediate to the essentially monomeric molecular intermediate being such that at least about 30% by weight of the final shaped structure is contributed by the macromolecular intermediate while at least about 10% by weight of the final shaped structure is contributed by the essentially monomeric molecular intermediate, the combination of the said complementary intermediates being accomplished by extrusion through an orifice of one said complementary polymer intermediate into the other.

The liquid complementary reactive polymer intermediates correspond to the formulas:

$$R-(X)_n$$
$$R'-(Y)_n$$

wherein $n$ is a small integer greater than 1, X is hydrogen more active than alcoholic hydrogen, Y is a group capable of reacting with alcohol at room temperature to form an ester, R and R' are members of the class consisting of the radical of a polyfunctional essentially monomeric organic polymer intermediate and the radical of a polyfunctional macromolecular polymer intermediate containing recurring amide-type linkages and having a molecular weight range of from about 400 to about 7000. The complementary reactive polymer intermediates are so chosen that at least 30% and preferably 60% of the weight of the final shaped article is contributed by the polyfunctional organic macromolecule whereas at least 10% of the weight of the final shaped article is contributed by the polyfunctional, organic, essentially monomeric molecule.

By the expression "a shaped body of continuous cross section" is meant a solid structure in the nature of a filament or film whose cross section is uniform and unbroken as opposed to structures which have soft or hollow centers. The terms "monomeric" and "essentially monomeric" are used interchangeably to signify a monomer or a "polymer" having a low degree of polymerization, i. e., dimer, trimer, etc. The term "polyfunctional" indicates the presence upon the molecule of at least two reactive groups capable of reaction with a complementary functionally substituted molecule to form a polymer under conditions of the present invention. The expression "polymer . . . intermediate" denotes a molecule polyfunctionally substituted and capable of reacting with a complementary polyfunctionally substituted molecule to form a polymer under reaction conditions of the present invention. By the expression "amide-type linkages" is meant that the molecule contains between recurring units, linkages represented by the formula $$\begin{matrix} & X \\ & \| \\ -A & -N- \\ & | \\ & R \end{matrix}$$

wherein

is a member of the class consisting of

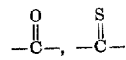

and

and R is hydrogen, lower alkyl, and lower alkylene when the diamine has a ring structure.

Figure 1:
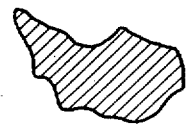
Figure 1 is a diagrammatic sketch of the typical spinning set-up of the present invention.

In Figure 1 one of the reactive intermediates is supplied through the supply tube 2 and extruded through the orifice 3 into the other complementary reactive polymer intermediate 1. The filament 4 which is formed by the reaction of the two intermediates is then led around the rollers 5 and 6 to be wound in the conventional manner.

The following examples are cited to illustrate the invention. They are not intended to limit it in any manner. Among the physical properties reported for the products in the examples, "polymer melt temperature" is the minimum temperature at which a sample of the polymer leaves a wet, molten trail as it is stroked with moderate pressure across a smooth surface of a heated brass block. "Fiber stick temperature" is the temperature at which the fiber will just stick to a heated brass block when held against the surface of the block for 5 seconds with a 200 grams weight. "Zero strength temperature" is the average temperature at which the two ends of the fiber break if heating is continued with the weight left on after the fiber stick temperature has been determined. "Initial modulus" is determined by measuring the initial slope of the stress strain curve. The invention has particular value in the preparation of articles having high elasticity. In reporting this property those structures are included which exhibit elastic recoveries above 90% and stress decays below 20%. Elastic recovery is the percentage return to original length within one minute after the tension has been released from a sample which has been elongated 50% at the rate of 100% per minute and held at 50% elongation for one minute. Stress decay is the percent loss in stress in a yarn one minute after it has been elongated to 50% at the rate of 100% per minute.

*Example I*

A low molecular weight polyamide is prepared by reacting 13.5 grams (0.10 mol) of an aqueous solution containing 86% hexamethylene diamine with 15.04 grams (0.08 mol) of azelaic acid in a large polymer tube. The tube is evacuated, flushed with nitrogen, and the contents melted at 245° C. Water is removed for 20 hours at that temperature at atmospheric pressure and under vacuum for 3 hours until a final pressure of 0.2 mm. of mercury is obtained. A 95% yield of carboxyl-free polymer with an average molecular weight of 1678 is obtained.

This macromolecular intermediate, so prepared, is extruded through a single hole spinneret into a 220° C. bath comprising 2% by weight of 4-methyl-m-phenylene diisocyanate in a silicone oil (D. C. Fluid 550 made by Dow Corning Corp. of Midland, Michigan). The filaments obtained are drawable two times their extruded length in hot air. They have a polymer melt temperature of about 200° C.

*Example II*

A polyamide with a molecular weight of 1500 is prepared by heating N,N'-diisobutylhexamethylenediamine with azelaic acid overnight. This liquid, macromolecular intermediate with —NH ends is extruded through a one-hole spinneret into liquid hexamethylenediisocyanate (a monomeric intermediate) at room temperature to produce a rubbery filament.

*Example III*

The low molecular weight polyamide of the preceding example is mixed with 2 mols of triethylamine (an acid acceptor) for each mol of polymer. This mixture is extruded through a one-hole spinneret into liquid sebacyl chloride at room temperature. A rubbery filament is obtained.

*Example IV*

A "trimer" with hydroxyl ends is prepared by heating and stirring 3 mols of poly(tetramethylene oxide) glycol having a molecular weight of 1000 with 2 mols of 4-methyl-m-phenylenediisocyanate and continuing the heating for 3 hours over a steam bath. This product is provided with reactive isocyanate ends by reacting it for one hour under similar conditions with 2 mols of p,p'-methylenediphenylisocyanate for each mol of "trimer." The product from the second reaction is mixed with sufficient N,N-dimethylformamide to make a spin dope containing 75% solids. The spin dope is extruded at 30–35 pounds per square inch through an 8 mil one-hole spinneret into a liquid ethylenediamine bath. The filaments formed are removed at a rate of 56 feet per minute. They are thereafter transferred through air from the take-up roll to a second roll, which collects the filaments at a rate of 80 feet per minute. They are then wound up on a bobbin immersed in water at 67 feet per minute. The as-spun filaments are heat-set in water and boiled-off to yield filaments with the following properties: Tenacity=0.89 g. p. d., elongation=319%, initial modulus=0.13 g. p. d., denier=45, stress decay=8.1%, and tensile recovery=98%. The polymer in these filaments has an inherent viscosity in hexamethylphosphoramide of 1.03, as compared to an inherent viscosity in the same solvent of 0.98 for a polymer of the same composition prepared by mixing solutions of the same two reactants.

*Example V*

A portion of the spin dope of the preceding example is extruded into a bath comprising 50% ethylene diamine and 50% triethylenetetramine. The filament obtained is removed from the bath at a rate of 44 feet per minute and is wound up at a rate of 57 feet per minute on a bobbin immersed in water. After relaxing in boiling water, the as-spun filaments have the following properties: Tenacity=0.25 g. p. d., elongation=332%, initial modulus=0.24 g. p. d., denier=187, stress decay=15 percent, and tensile recovery=96%.

As will be apparent from the examples above, the polymer comprising the final shaped article may be of the linear, cross-linked or a combination of the two varieties. Furthermore, the polymeric product, regardless of its variety of linkage, may be of a coupled type, i. e. only one of each of two complementary intermediates is used in its production, or segmented, i. e. a mixture of at least two homofunctional species of one intermediate is reacted with one or more species of complementary homofunctional intermediates. In the formation of the segmented products the speed of reaction between the various complementary intermediates is preferably substantially equal. It is preferable that the speed of reaction of the fastest reacting complementary intermediates be close to the speed of reaction of the slowest reacting complementary intermediates in any particular system.

The invention is particularly useful in the preparation of shaped articles possessing elasticity. The degree of elasticity will vary somewhat with the identity of the complementary polymer intermediates.

The effect of the macromolecular polymer intermediates is particularly pronounced in this regard. In general, highly elastic products may be formed with macromolecular intermediates having a molecular weight in the lower end of the range specified, i. e., around 400, provided the product is cross-linked or segmented with units of polymer derived from essentially monomeric polymer intermediates. A macromolecular intermediate of somewhat higher molecular weight, around 800, is preferable, when the product formed is a linear coupled polymer. The use of a macromolecular intermediate having a melting point no higher than about 50° C. is particularly advantageous in imparting elasticity to the final product.

The elastic properties of the structures obtained is varied to a lesser extent by the essentially monomolecular intermediates. This applies particularly to the structures derived from linear polymers prepared by the process of the invention. For example, if each reaction phase contains an essentially monomeric intermediate in addition to the macromolecular intermediate (present with at least one essentially monomeric intermediate) the product obtained will be a segmented copolymer as previously defined. For optimum elastic properties of such structure it is preferred that these two complementary essentially monomeric intermediates be capable of reacting together to form a polymer with a polymer melt temperature above 200° C. in the fiber-forming molecular weight range. The higher the melting point of this segment, the closer the molecular weight of the macromolecular intermediate can approach the minimum value and still retain excellent elasticity. If the reactive macromolecular intermediate is extruded into a liquid comprising only one complementary, essentially monomeric fast-reacting intermediate, then it is preferred that this essentially monomeric intermediate be capable of reaction with the end groups of the macromolecular intermediate to form a polymer which melts above 250° C. in the fiber-forming molecular weight range. The variation of elasticity caused by the character of the essentially monomolecular intermediate, as mentioned above, is much less pronounced when cross-linked structures are prepared. However, generally it is preferred that the final structure contain only a small number of cross-links per molecule. This can be accomplished by using a relatively high molecular weight macromolecular intermediate (one having a molecular weight in the range of about 3000 to about 5000) or by using at least two complementary essentially monomeric intermediates, one of which is difunctional and one of which is multifunctional, the latter representing a small percentage of the mixture.

The use of a macromolecular intermediate having a molecular weight above the indicated minimum values has an advantage due to the fact that a high moleculai weight fiber-forming polymer is obtained by combination of a relatively small number of molecules. As a result, little by-product is formed, particularly where polymerization proceeds by condensation. This simplifies threadline formation and attendant purification processes. Furthermore, high solids spinning dopes (i. e. the material extruded) can be used, which reduces solvent removal and recovery problems. An important end result is the ready formation of solid structures, such as filaments and films, rather than collapsed tubular filaments or laminated films. For these reasons the use of at least one macromolecular intermediate having a molecular weight of about 1000 to about 5000 is preferred.

The liquid complementary reactive polymer intermediates are combined in accordance with the present invention, by extruding at least one such intermediate through an orifice into its complement and the shaped article formed is led away from the orifice as it forms to a reel or other suitable conventional wet-processing collecting means. Generally it is preferred to extrude the phase containing the macromolecular intermediate. For spinning fibers extrusion may be through a conventional wet-spinning spinneret. A spinneret providing an orifice of about 3 to about 10 mils is preferred although orifices of larger diameter may be employed. Furthermore, orifices of shapes other than round are suitable. A slotted orifice may be used to produce films and ribbons. The shaped article may be washed, stretched, lubricated or otherwise after-treated.

Preferably each complementary reactive intermediate is a liquid under the conditions of the reaction or is dissolved in a liquid diluent. However, one of the said intermediates may be a finely divided solid dispersed in a liquid in which it is at least partially soluble. When diluents are employed it is preferred that the total concentration of the extruded intermediate be at least about 35% by weight of extruded material. Use of higher concentrations promotes compactness of the polymeric structure and reduces the problems associated with handling large volumes of solvents, particularly the organic solvents, which tend to be toxic, expensive, inflammable, etc. Satisfactory solid products can be obtained by using lower concentrations for some sets of complementary intermediates.

The speed at which the formed solid shaped products can be collected will depend upon the specific reactants and reaction conditions, such as the diluents used and the concentration of the reactants in these diluents. Much of the influence exerted by the diluents appears to lie in their effect upon the base strength of the intermediate reactant which is to act as a proton donor in the reaction. For example, the effect is quite marked when water is used as a diluent, but inert diluents for diamines, such as benzene and dioxan, appear to exert little noticeable effect on the course of the reactions involved in this process. Additional functions of the diluents are to control the viscosity of the phases and the interfacial tension between the extruded phase and the bath. For example, it has been noted that the addition of low percentages of N,N-dimethylformamide to viscous spin dopes permits better penetration by the bath and results in higher tenacities.

Useful inert diluents for diamines include dioxan, benzene, tetrahydrofuran, and the like. Suitable inert materials for diluting acid halides, such as acid chlorides and chloroformates, include benzene, toluene, xylene, cyclohexane, trichloroethylene, chlorobenzene, nitrobenzene, heptane, isooctane, diethyl ether, ethyl acetate, methyl amyl ketone, ethylene dichloride, carbon tetrachloride, chloroform, etc. It is essential that the diluents be materials which do not react as readily with either polymer-forming intermediate as does its complementary intermediate, and thus reduce the probability of polymer formation.

While it is sometimes desirable to add an acid acceptor to a system which involves a reaction between a diacid halide and a coreactant, it is not necessary to do so. The particular advantage in using about an equivalent of alkali per equivalent of diamine in the bath is that it regenerates the diamine from any amine hydrohalide that forms, and minimizes the recovery of diamine from bath liquors. The process is ordinarily operated at room temperature, although temperatures ranging from −10° C. to 90° C. have been used successfully.

As previously defined, one of the complementary polymer intermediates contains at least two active hydrogens more reactive than alcoholic hydrogen, i. e. the hydrogen of an alkanol. Among end groups providing such a hydrogen may be mentioned —SH, phenolic-OH, amino-NHR (in which R is H or alkyl) and amidino. The other complementary polymer intermediate contains at least two reactive groups capable of reacting with alcohol to form an ester. Among such groups may be mentioned the acid chloride group, the chloroformate group and the isocyanate group. The use of complementary polymer intermediates which form a self-supporting polymeric structure within 10 seconds after combination at room temperature is preferred. A large variety of suitable such combinations is illustrated in copending U. S. application No. 226,066, filed May 12, 1951, now Patent No. 2,708,617.

As previously disclosed the multifunctional organic macromolecular intermediate is a compound having a molecular weight within the range of from about 400 to about 7000 and containing recurring amide-type linkages. Suitable materials include polyamides, polyureas, polysulfonamides, polyurethanes combinations of these and the like. The polymer chains may be interrupted by oxygen or sulfur. They may be substituted with halogen or the like.

Polyurethanes suitable for use as macrointermediates can be prepared by reacting the bischloroformates of glycols, such as ethylene glycol, cyclohexanediol, or the polyether glycols, with a primary or secondary diamine, such as hexamethylenediamine, 1,4-diaminocyclohexane, p-phenylene-diamine, and piperazine. For elastomers, these are preferably the aliphatic diamines, such as ethylenediamine, propylene-diamine, butylenediamine, pentamethylenediamine, hexamethylene-diamine, and N,N-diisobutylhexamethylenediamine. As shown by the examples, this can also be accomplished by reacting low molecular weight polyether glycols, such as the poly-(alkylene oxide) glycols, with diisocyanates.

Polyureas may be obtained by (1) reacting diamines with phosgene, (2) reacting phosgene with a diamine to form a biscarbamyl chloride, which is reacted subsequently with another diamine or more of the same diamine to form a polyurea, or (3) by reacting a diamine with a diisocyanate. Any diamine, such as ethylenediamine, propylenediamine, butylenediamine, pentamethylenediamine, hexamethylenediamine, p-phenylenediamine, 4-methyl - m - phenylenediamine, bis(p - aminomethyl)-methane, 1,4-diaminocyclohexane, piperazine, and trans-2,5-dimethyl-piperazine, may be used. The corresponding diisocyanates, such as hexamethylene diisocyanate and 4-methyl-m-phenylene diisocyanate, may be used as coreactants whenever available. When low melting low molecular weight polymers are desired, it is preferable to prepare copolymers from aliphatic diamines or diisocyanates, with long chain or branched chain aliphatic diamines producing lower melting polymers more readily.

Polyamides are prepared by reacting acids or their amide-forming derivatives, particularly the acid halides, such as those derived from oxalic, succinic, adipic, suberic, azelaic, sebacic, isophthalic, terephthalic, hexahydroterephthalic, 1,5-naphthalene disulfonic, 1,2-ethanedisulfonic, and 1,6-hexanedisulfonic acids, with the diamines listed in the two preceding paragraphs. Once again, if it is desired that the low molecular weight macrointermediate be low melting, it is preferred that all of the intermediates used to prepare the polyamides be aliphatic. Disecondary diamines, such as N,N'-diisobutylhexamethylenediamine, are particularly useful for this purpose.

The polyfunctional essentially monomeric organic polymer intermediate may be any polymer-forming molecule corresponding to the formulae

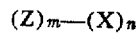

and

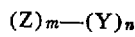

wherein $n$ is a small integer greater than 1, X is hydrogen more active than alcoholic hydrogen, Y is a group capable of reacting with alcohol at room temperature to form an ester, Z is an organic radical and $m$ is a small number at least 1. Among such materials may be mentioned alkylene diamines such as ethylene diamine, propylene diamine, hexamethylene diamine, as well as phenylene diamine, diamino-cyclohexane, diethylene triamine, adipyl chloride, sebacyl chloride, terephthaloyl chloride, phenols such as resorcinol, the bis chloroformates of the alkylene glycols and the like.

The shaped bodies of the present invention are of continuous and uniform cross-section, i. e. they are solid without soft or open centers. In general, these structures are relatively stable to hydrolysis under the conditions used for commercial laundering. This is an important attribute for filaments which are to be utilized in fabrics subject to washing. Most are more resistant to oxidation than are the conventional elastic filaments. If desired, their stability can be improved by incorporating commercially available antioxidants and ultra-violet light stabilizers.

The high tenacity, high initial modulus, excellent abrasion resistance, and easily controlled elongation of the elastic structures prepared by the process of this invention fit them for many applications, particularly in film and filament form, for which rubber is undesirable. A particular advantage is that uncovered low denier multifilaments can be used to prepare sheer elastic fabrics. An important additional advantage, particularly for filaments, is that solid structures are obtained by a simple process. A large percentage of the rubber threads used are prepared by slitting rubber sheets. This produces relatively large denier filaments, which cannot be converted readily into multifilaments and are not acceptable for many uses, particularly in certain fabrics.

In general, the process of this invention provides a very useful tool for preparing films and fibers comprising high molecular weight condensation polymers. The process circumvents many of the normal steps required for converting polymeric materials into useful shaped articles. It provides the only method for the preparation of shaped articles from certain polymeric materials, for example, those prepared from intermediates that are unstable at the high temperatures normally required in the condensation reaction. It provides a method for preparing elastic polymers of sufficiently high molecular weight at room temperatures that the shaped articles are useful. Also, intermediates which would normally be too impure for conventional melt polymerization can be used. In addition, there is no need to maintain a delicate balance of materials in order to obtain high molecular weight polymer, as is required by melt polymerization. There is also provided a new method for preparing films and filaments comprising certain cross-linked polymers.

Many equivalent modifications will be apparent to those skilled in the art from a reading of the above description without a departure from the inventive concept.

What is claimed is:

1. A process which comprises forming a solid shaped structure by combining at least two liquid complementary reactive polymer intermediates, one of which contains at least two active hydrogens more reactive than alcoholic hydrogen, whereas its complement contains at least two reactive groups capable of reacting with alcohol at room temperature to form an ester, and at least one of the said complementary reactive polymer intermediates being a multifunctional organic macromolecule possessing recurring amide type linkages of the class consisting of

wherein

is a member of the class consisting of

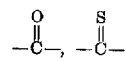

and

and R is a member of the class consisting of hydrogen, lower alkyl, and the lower alkylene chain of a heterocyclic diamine and having a molecular weight within the range of from about 400 to about 7000, and at least one of the other of the said complementary reactive polymer intermediates being a polyfunctional, monomeric, organic molecule, the proportionate molecular weights of macromolecular intermediate to the monomeric molecular intermediate being such that at least about 30% by weight of the final shaped structure is contributed by the macromolecular intermediate while at least about 10% by weight of the final shaped structure is contributed by the monomeric molecular intermediate, the combination of the said complementary intermediates being accomplished by extruding through an orifice one said complementary polymer intermediate into the other.

2. The process of claim 1 wherein the macromolecular intermediate comprises at least about 60% by weight of the final shaped article.

3. The process of claim 1 wherein the extruded liquid contains a macromolecular intermediate.

4. The process of claim 1 wherein the macromolecular intermediate is essentially a polyamide.

5. The process of claim 1 wherein the macromolecular intermediate is essentially a polyurethane.

6. The process of claim 1 wherein the macromolecular intermediate is essentially a polyurea.

7. The process of claim 1 wherein the active hydrogens more active than alcoholic hydrogen are supplied by a mercaptan radical.

8. The process of claim 1 wherein the active hydrogens more active than alcoholic hydrogen are supplied by a phenolic hydroxyl radical.

9. The process of claim 1 wherein the active hydrogens more active than alcoholic hydrogen are supplied by an amino-NHR radical wherein R is a member of the class consisting of hydrogen and alkyl.

10. The process of claim 1 wherein the active hydrogens more active than alcoholic hydrogen are supplied by an amidino radical.

11. The process of claim 1 wherein the reactive groups capable of reacting with alcohol at room temperature to form an ester are acid halide.

12. The process of claim 1 wherein the reactive groups capable of reacting with alcohol at room temperature to form an ester are carbonyl halide.

13. The process of claim 1 wherein the reactive groups capable of reacting with alcohol at room temperature to form an ester are haloformate.

14. The process of claim 1 wherein the reactive groups capable of reacting with alcohol at room temperature to form an ester are isocyanate.

15. The process of claim 1 wherein the complementary reactive intermediates combine to form an amide.

16. The process of claim 1 wherein the complementary reactive intermediates combine to form a urethane.

17. The process of claim 1 wherein the complementary reactive intermediates combine to form a urea.

18. The process of claim 1 wherein the complementary reactive intermediates combine to form an ester.

19. The process of claim 1 wherein the complementary reactive intermediates combine to form a sulfonamide.

20. The process of claim 1 wherein each complementary reactive intermediate contains only two reactive groups.

References Cited in the file of this patent

UNITED STATES PATENTS 2,708,617    Magat ---------------- May 17, 1955

UNITED STATES PATENT OFFICE

CERTIFICATE OF CORRECTION

Patent No. 2,813,775                                    November 19, 1957

Walter Steuber

It is hereby certified that error appears in the printed specification of the above numbered patent requiring correction and that the said Letters Patent should read as corrected below.

Figure 2:
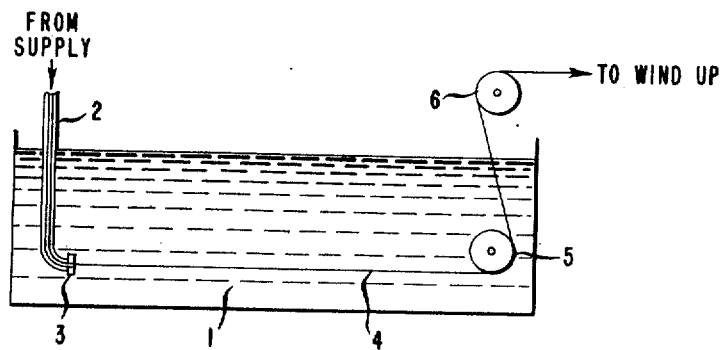
Figure 2 is an illustration of a cross-sectional element of a filament prepared in accordance with the present invention.

Column 2, line 44, for "Figure 1" read --Figure 2--; line 46, for "Figure 2" read --Figure 1--; line 49, for "Figure 1" read --Figure 2--.

Signed and sealed this 14th day of January 1958.

(SEAL)
Attest:
KARL H. AXLINE

Attesting Officer

ROBERT C. WATSON
Commissioner of Patents